Aug. 16, 1927.
R. J. WOOD
PROTECTED CARD INDEX SYSTEM
1,639,016
Filed Oct. 6, 1919
6 Sheets-Sheet 1
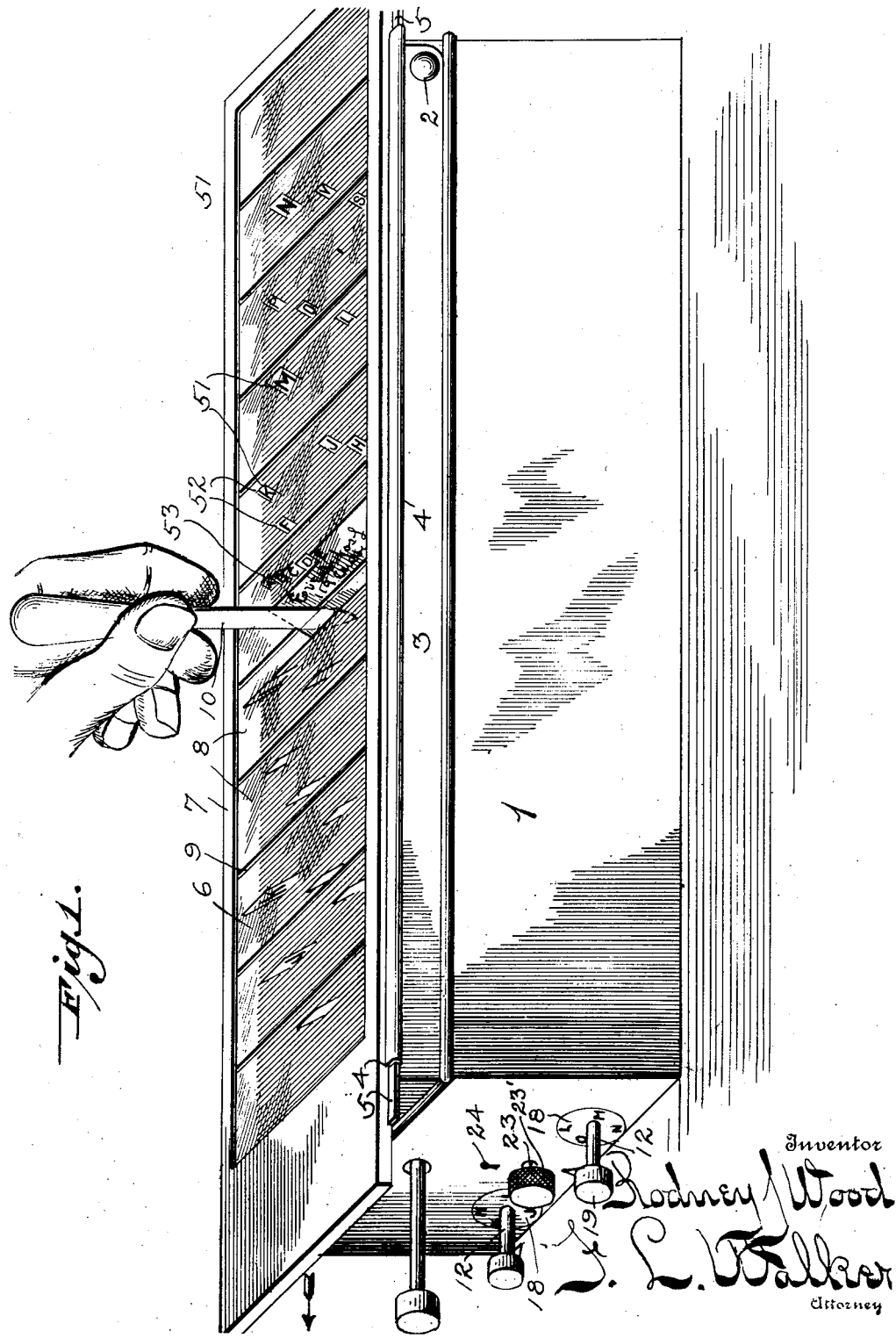

Aug. 16, 1927.
R. J. WOOD
1,639,016
PROTECTED CARD INDEX SYSTEM
Filed Oct. 6, 1919     6 Sheets-Sheet 2
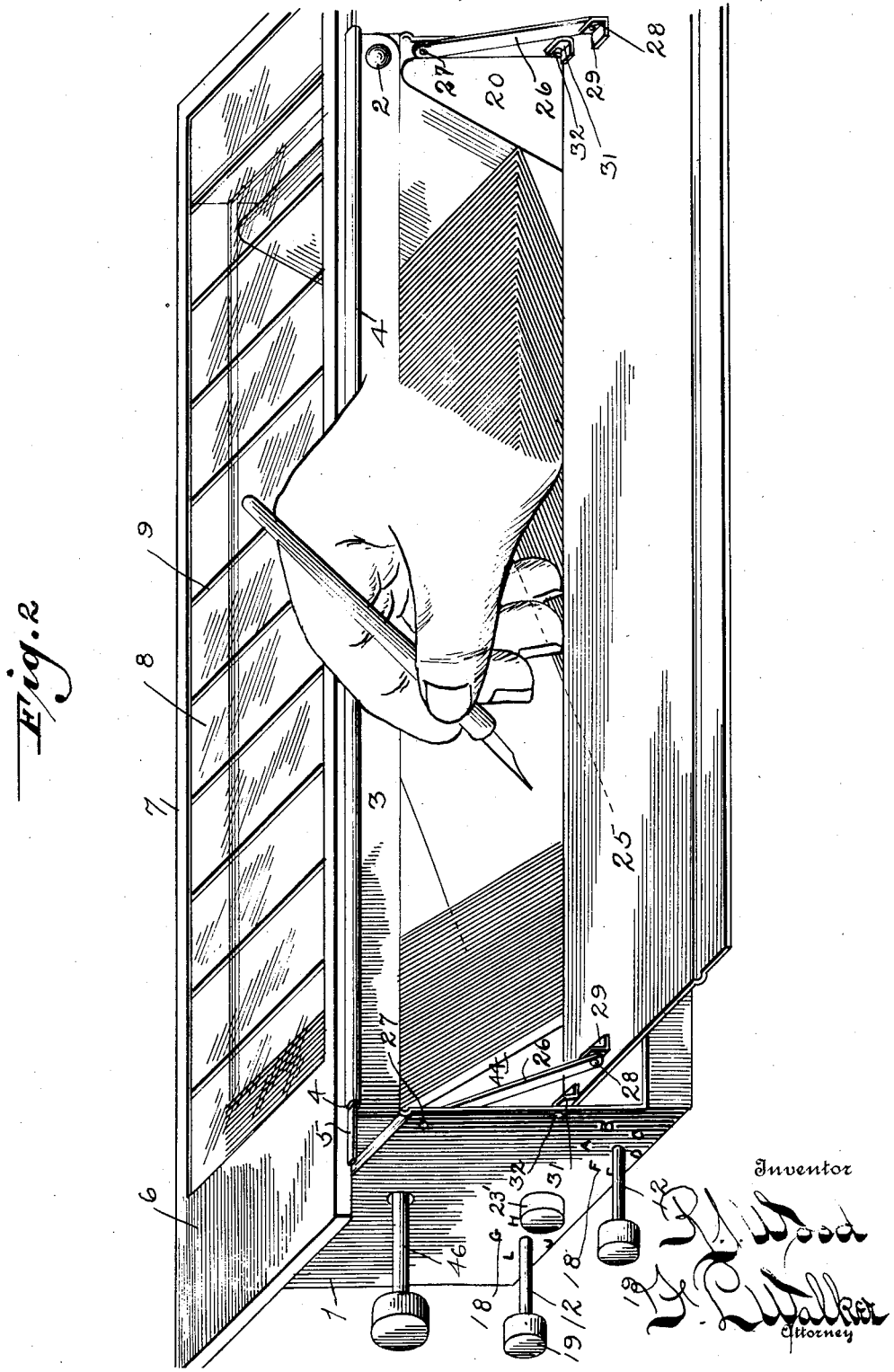

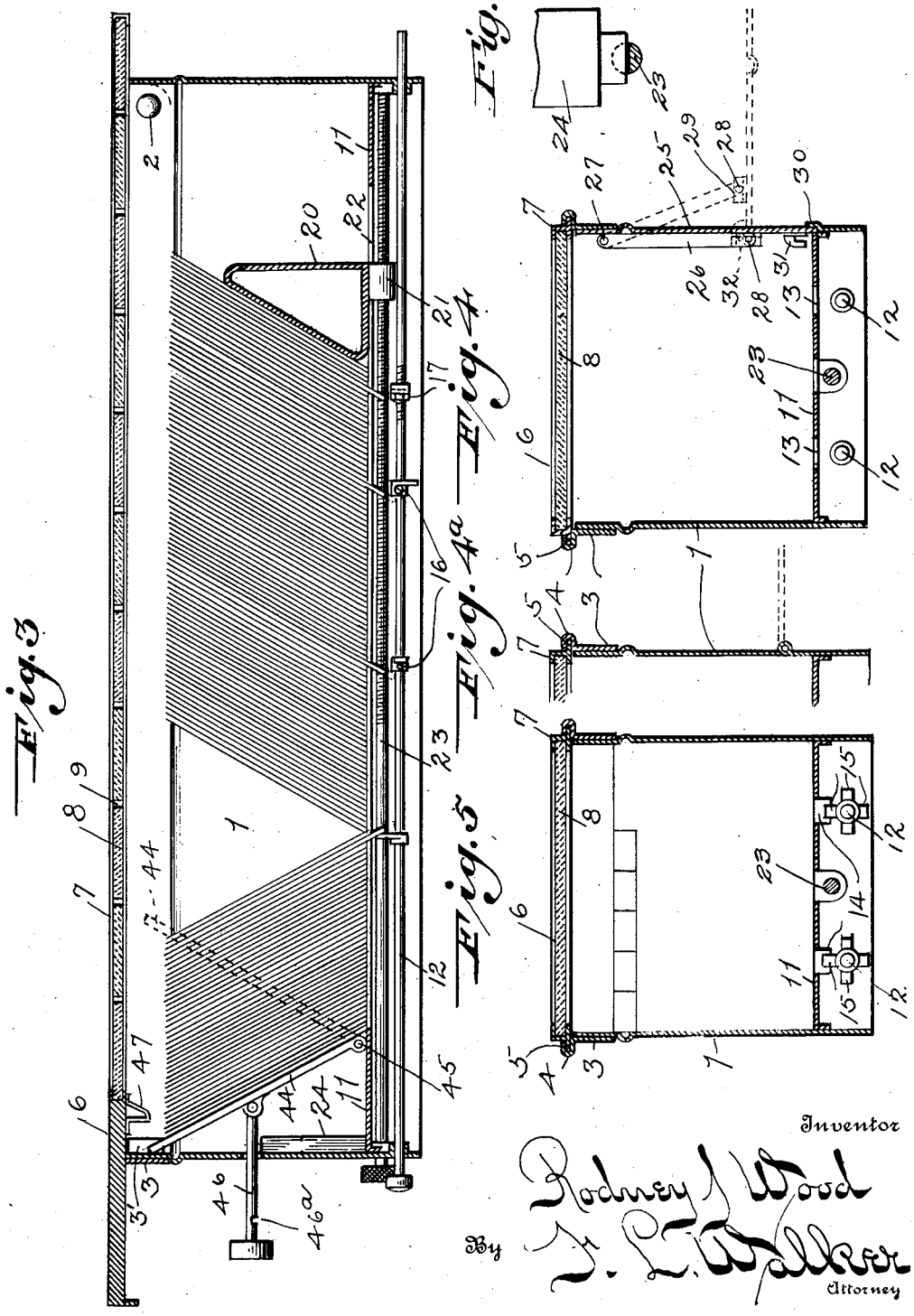

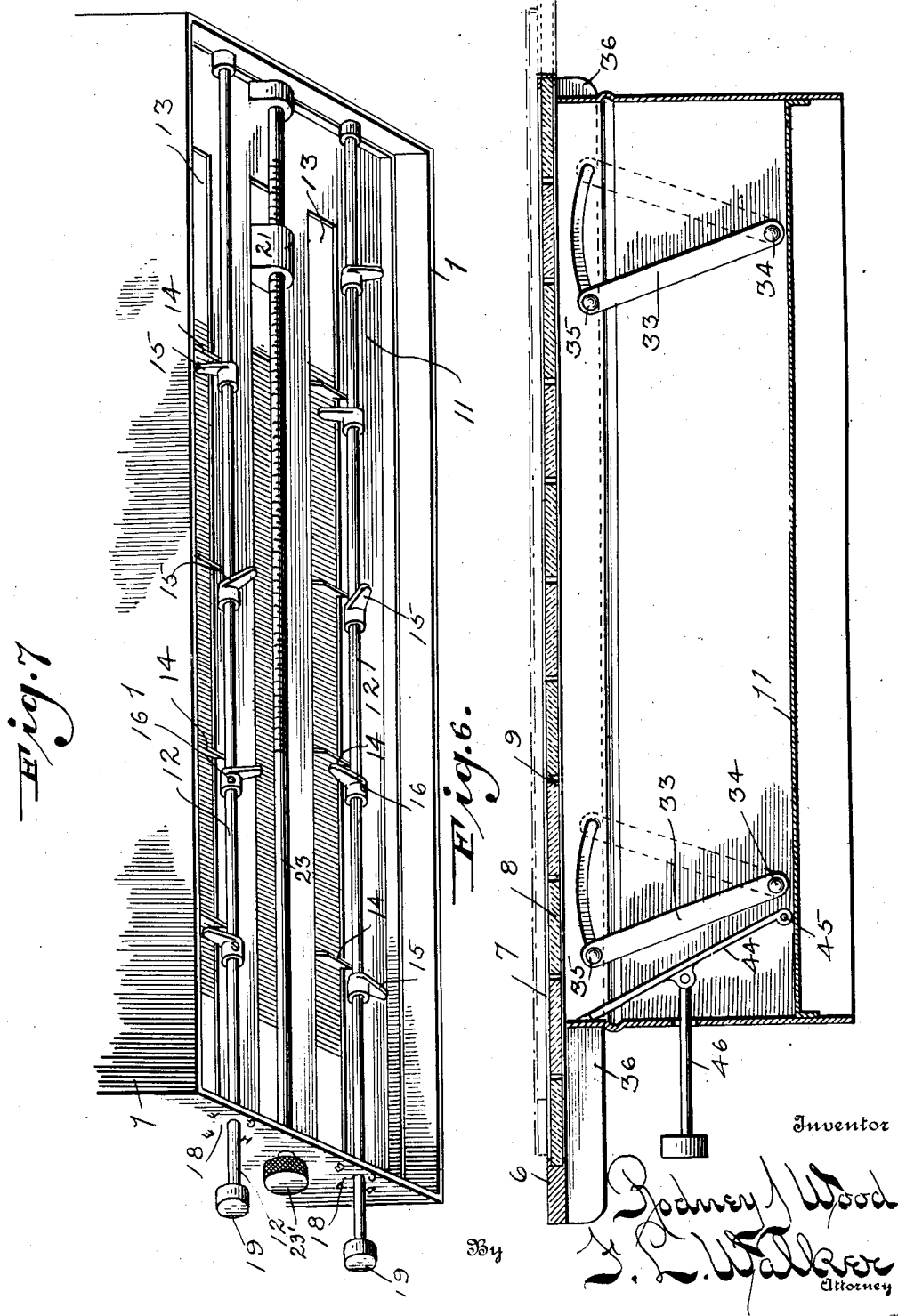

Aug. 16, 1927.     1,639,016
R. J. WOOD
PROTECTED CARD INDEX SYSTEM
Filed Oct. 6, 1919     6 Sheets-Sheet 5
Fig.12
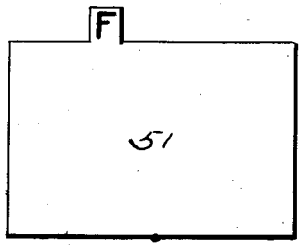
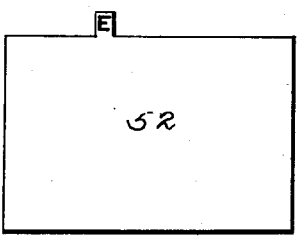
Fig.13.
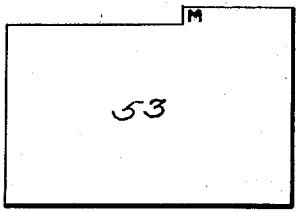
Fig.14
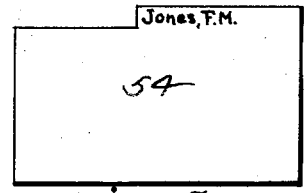
Fig.15
Inventor
Rodney J Wood
By F L Walker
Attorney Aug. 16, 1927.
R. J. WOOD
1,639,016
PROTECTED CARD INDEX SYSTEM
Filed Oct. 6, 1919     6 Sheets-Sheet 6
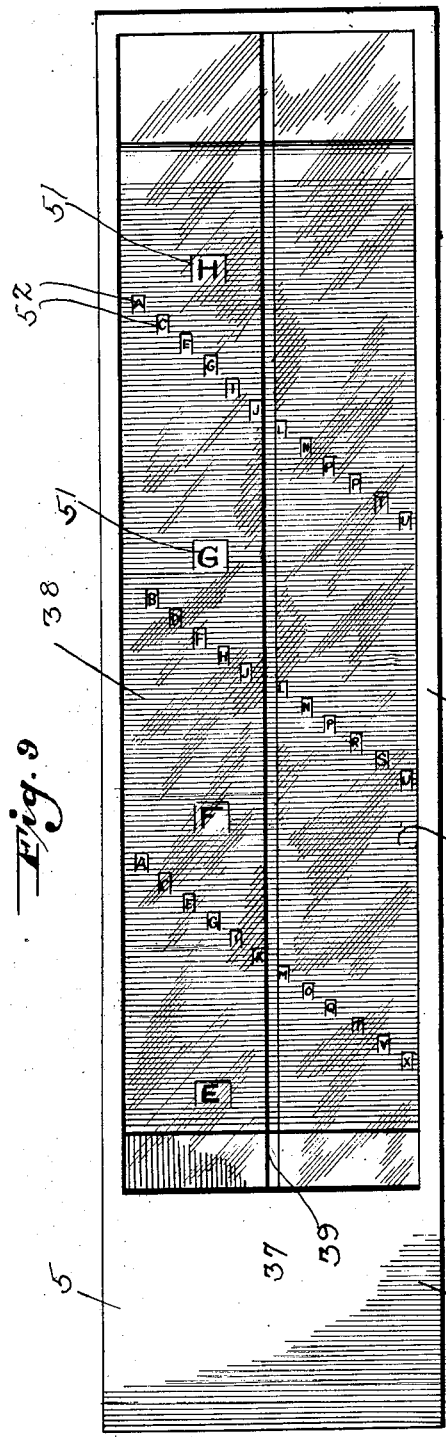
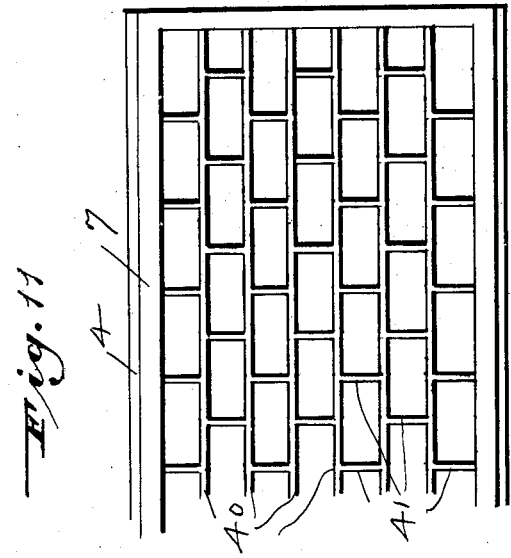
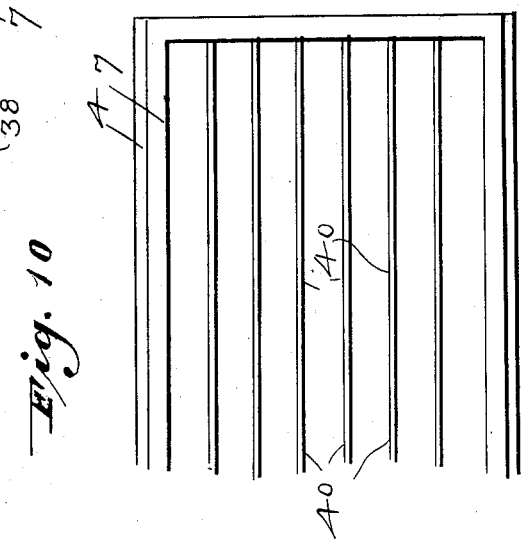

Patented Aug. 16, 1927.

1,639,016

UNITED STATES PATENT OFFICE.

RODNEY J. WOOD, OF DAYTON, OHIO.

PROTECTED CARD-INDEX SYSTEM.

Application filed October 6, 1919. Serial No. 328,879.

This invention relates to card filing systems in which records or data, names, or other matter is contained upon a succession of sheets of paper or cards, and more particularly to a system of indexing such records or data and a container or file box for the cards or data sheet, which enables the selection of a desired card or data sheet with facility and despatch, while preventing unauthorized tampering with the records or removal of the cards.

The object of the invention is to improve the structure and operation of file boxes or containers and the arrangement of the data cards or sheets therein, whereby they will not only be economical in manufacture, but will be easily and quickly operated to effect the selection of a desired card or data sheet, compact, adaptable to wide range of uses, and unlikely to get out of repair.

A primary object of the invention is to provide full and complete protection against the intentional abstraction or accidental loss of record cards or data sheets, or the alteration of the records contained thereon by rendering the information or data contained upon such cards or sheets quickly available for information, yet inaccessible for removal, alteration or destruction.

A further object of the invention is to provide protective means for the series of cards or data sheets, which while preventing removal or tampering therewith will nevertheless enable the addition or insertion at selected points of the series of additional cards or data sheets.

A further object of the invention is to provide a filing apparatus which will be compact in form, light in weight, pleasing in appearance and flexible or elastic in character to permit the filing of records or data sheets under a few or a great many titles or headings, and to provide a convenient easily operated index system by which any card or data sheet may be quickly selected.

With the above primary and other incidental objects in view as will more fully appear in the specification, the invention consists of the features of construction, the parts and combinations thereof and the mode of operation or their equivalents as hereinafter described and set forth in the claims.

Referring to the drawings, Fig. 1 is a perspective view of the improved form of file box having a sliding top by the manipulation of which the series of file cards are opened easily at any selected point, and further illustrating the method of selecting the desired card or data sheet. Fig. 2 is a perspective view of the file box opened to permit the correction, alteration, or addition of data contained upon the cards or sheets without the necessity of removing such cards from the file box. Fig. 3 is a longitudinal sectional view of the file box and the series of cards contained therein. Fig. 4 is a transverse sectional view of the file box embodying the lateral opening construction illustrated in Fig. 2. Fig. 4ª is a detail view of a modification of the side opening feature. Fig. 5 is a similar transverse sectional view of the file box omitting the open side feature. Fig. 6 is a longitudinal sectional view of a modification of the file box embodying an oscillating top or cover section in lieu of the sliding section disclosed in the preceding figures. Fig. 7 is a detailed perspective view of the under side of the file box illustrating the selective apparatus for different card sections. Fig. 8 is a side view of the file box on a tilting base. Fig. 9 is a top plan view of a modification of the top or cover for the file box, thru which the desired card is selected. Figs. 10 and 11 are further modifications of the protective top or cover for the file box. Figs. 12, 13, 14, and 15 illustrate different forms of file cards comprising the series. Fig. 16 is a detail view of the locking means for the adjusting screw.

Like parts are indicated by similar characters of reference throughout the several views.

The card filing system herein described is adaptable to a wide range of uses, for instance, as a statistical record, or a record system of treatments for physicians or dentists, merchandise and stock records, customers' or agents' list of names mailing list, ledger accounts, or any other purpose for which card systems are ordinarily employed. The construction of the file box is such that the contents thereof are always available for ready reference and accessible for the insertion of new cards or data sheets, which once inserted cannot thereafter be removed, altered or otherwise tampered with by unauthorized persons. To this end the file box or container comprises an oblong rectangular box or receptacle 1 of any suitable material but which is preferably formed from sheets metal. Pivoted at 2 to the box or container 1 adjacent to one end and to the upper edge thereof is a locked lid or closure comprising a frame portion 3 adapted to enclose the upper edges of the box or receptacle 1, provided with longitudinal gibs or grooved flanges 4, to receive the lateral flanges 5 of the sliding top 6. The closure frame 3 is normally secured in closed position by a lock 3' (Fig. 3). As shown in Figs. 1 to 5 inclusive, the sliding top 6 comprises a rigid channeled frame 7, in which are mounted a series of glass sections 8 spaced slightly one from the other to afford intermediate crevices or narrow slots 9. The cover 6 thus comprises a movable window through the transparent glass sections 8 of which the cards or data sheets within the receptacle 1 may be observed. The record cards or data sheets within the receptacle 1 are provided with suitable guide or index cards, by which the selection of any particular card is facilitated. These index or guide cards are visible through the transparent top 6 and the selection is effected by introducing through the narrow slot 9, between two transparent sections 8 adjacent to the locality in which the desired cards may be located, a thin flat blade-like selecting implement 10 as shown in Fig. 1. The end of this implement is introduced between successive cards of the series within the receptacle 1, and while so introduced the sliding top 6 is reciprocated longitudinally, thereby oscillating the cards or data sheets as is usual in a card index file. The cards within the receptacle 1 although at all times visible cannot be removed as the crevices or slots 9 are much too narrow to permit the grasping of any card either with the fingers or any engaging implement. However, by introducing the selecting implement 10 between successive cards and manipulating the sliding top 6, the cards may be quickly and easily oscillated or opened at any desired point. However, to facilitate this selection at a preliminary operation by which the cards are opened by certain predetermined points or sections the bottom of the receptacle 1 is somewhat elevated as shown in Figs. 3, 4 and 5 at 11. Slidingly mounted in the end walls of the receptacle 1 beneath the bottom 11 of such receptacle, and also revoluble in said walls, are one or more selecting rods 12. Formed in the bottom 11 of the receptacle 1, immediately above each such selecting rod 12 is a longitudinal slot 13. At intervals throughout the series of cards are sectional guide cards, for instance, alphabetical guide cards or numerical guide cards, or guide cards for certain commodities, each of which cards is provided with a dependent extension 14, so located as to project through one or the other of the slots 13 in the bottom 11 of the receptacle. Carried by each selective rod 12 is a series of radially disposed fingers 15, adjustable upon the rod 12, and adapted to be secured in adjusted position, in predetermined relation with the projecting extensions 14 of the sectional guide cards. The radial fingers 15 may be provided with set screws 16, or may be screw threaded upon the selective rod 12, and provided with lock nuts as indicated at 17. Any suitable method of securing the fingers in adjusted position may be employed. As shown in Figs. 3 and 5, the fingers are disposed in different radial positions. The forward end of the container or box 1 is provided with an index head or dial 18 for each rod 12, while each rod 12 carries a coacting pointer or indicator which may be merely a mark upon the head or knob of the rod, which coacts with the dial or index head to indicate the particular radial finger which may be turned upward and therefore into line with the projecting extension 14 of the corresponding sectional guide card. In operation the selective rod 12 is rotated by means of the head or knob 19, until the desired sectional guide is indicated upon the index dial 18, whereupon the rod 12 is pressed inward. This reciprocation of the rod 12 causes the upturned radial finger 15 carried thereby and turned to operative positions by the rod 12 to engage the projecting extension 14 of the corresponding sectional guide and by pressing rearward upon such extension causes the guide to be oscillated forward thereby opening the series of record cards or data sheets at a predetermined point. The subsequent selection of the desired record card or data sheet may be effected by means of the selecting implements 10 introduced through the slot 9 of the sliding cover 6, and the subsequent manipulation of the sliding top. If so desired the selective rods 12 may be entirely omitted and all selective steps effected by the introduction of an implement through the sliding top and subsequent reciprocation of the top while such implement is engaged between successive cards. The box or receptacle 1 is further provided with the usual follower block 20 having a dependent lug 21 projecting through a slot 22 in the bottom 11 of the receptacle. This projecting lug 21 is screw threaded upon a longitudinal screw threaded shaft 23, revolubly mounted in the end walls of the receptacle 1 below the bottom 11 thereof. By rotating the threaded shaft 23 by means of the external knob or handle 23', the follower block may be moved forwardly or rearwardly. On its forward movement, it may be made to compress the series of cards or data sheets within the receptacle. A lock 24 at the forward end of the receptacle 1 serves to lock the shaft 23 against rotation. By operating the threaded shaft 23 to advance the follower block 20, placing the record cards or data sheets under compression, and subsequently locking the shaft, access to the cards may be effectually prevented.

The series of record cards or data sheets being opened at the desired point by either or both of the selective means before described the inscription matter contained upon such cards or sheets may be easily read through the transparent top 6. Likewise in the event that it is desired to insert a new record card or data sheet, such card or sheet may be deposited at the proper point of the series through the slot or crevice 9 in the top 6. It is thus possible at all times to add to the series of cards within the receptacle, placing such new cards in proper sequence, but impossible to remove any card or data sheet or to alter the inscription thereon.

To enable entries or alterations to be made upon the record cards, by an authorized person without the necessity of removing the cards from the receptacle or disarranging their sequence, one side of the receptacle or box 1 may be designed to be opened outward to afford access for the hand of the operator beneath the cover 6. The movable side 25 of the receptacle may be hinged along its lower edge, and capable of being turned outward about its hinged connection, upon the elevation of the pivoted lid or cover frame 3 as shown in Fig. 4ª. However, a more convenient and desirable construction is afforded by supporting the movable side 25 of the receptacle 1 upon swinging links 26, which at 27 are pivoted to the end walls of the receptacle 1, and at 28 to lugs or ears 29 attached to the inner face of the movable side 25. In this construction, the lower edge of the side wall 25 when in its upright or normal closed position is seated within a channel or groove 30, at the edge of the bottom 11, while the upper edge of the movable side is enclosed within the cover frame 4. As the movable side is swung outward upon its supporting links 26, the lower edge of the side 25 moves upward. Secured to the inner face of the side wall 25 adjacent to its lower edge are notched ears or lugs 31, which engage inwardly projecting studs or pins 32 in the end walls of the receptacle 1, when the side 25 is extended laterally. Such construction is clearly shown in Figs. 2 and 4. When extended laterally the side wall forms a rest for the hand and arm of the clerk who may make entries on the card in the receptacle 1. To facilitate such entry, the follower block 20 is shifted rearwardly to approximately its limit of its movement, allowing the cards to be reclined backwardly approximately to a horizontal position as shown in Fig. 2. This affords a convenient position of the cards for the entry of additional data, or correction of previous entries.

In Fig. 6 there is shown a modification of the construction heretofore described, in which the transparent slotted top 6 in lieu of sliding in the longitudinal gibs or grooved flanges 4, is carried on oscillatory links 33 pivoted at 34, adjacent to the bottom of the receptacle 1, and connected at upper ends to the reciprocating cover 6, at 35. The top or cover in this construction is provided with dependent side flanges 36 which overhang the sides of the receptacle or box 1. In its reciprocatory movement under the guidance of the swinging links 33, the top or cover retains a parallel relation with the receptacle or box 1, but has a slight vertical movement simultaneous with its reciprocation.

While the construction of the top 6 as heretofore described, involving a series of glass sections separated one from the other to form intermediate narrow crevices or slots 9, is the preferred form of construction at the present time, it is obvious that other constructions may be employed in lieu thereof. In Fig. 9 there is shown a cover or closure 37, which may be stationarily secured upon the receptacle or box 1. This cover or closure comprises a rectangular frame containing two longitudinally disposed glass sections 38, spaced one from the other to afford a longitudinal crevice or narrow slot 39, extending substantially the full length of the receptacle or box 1. The selecting implement 10 may be introduced through the longitudinal slot 39, and by moving it forwardly or rearwardly within the slot the cards may be turned or opened at the selected point. Whereas in the construction heretofore described the movable cover and selecting implement 10 are moved in unison to and fro, in the construction shown in Fig. 9, the implement 10 is moved independent of the top or cover and in relation thereto. In Fig. 10 there is shown a further modification in which in lieu of the glass sections 38 shown in Fig. 9, there are employed a series of longitudinally disposed wires or rods 40. These wires extending longitudinally in relation to the receptacle or box 1, or transversely relative to the cards or data sheets, prevent the ready removal of the cards from the receptacle, but at the same time permit the introduction of the operator's fingers between the longitudinal wires or the use of an implement such as shown at 10, to oscillate the cards within the box 1. It might be possible in this construction, in the event that the cards were loosely arranged within the box, to turn a card longitudinally and thus remove it between the wires or rods 40. To overcome such difficulty, there is shown in Fig. 11, a further modification, in which additional wires or rods 41 are arranged transversely across the top or cover, thus forming with the longitudinal rods or wires 40 a screen through the successive openings of which the implement may be introduced to oscillate the cards. It will be understood that new cards cannot be introduced into the file through the protective covers shown in Figs. 9, 10, and 11 as they are introduced in the file through the slot 9.

While the cards or data sheets may be quickly or easily separated or opened by the reciprocation of the slotted cover 6, while the implement 10 is engaged through the slot 9 with the desired card, or by the use of the implement 10 through the slot 39 of Fig. 9 or between the rods or wires 40 and 41 of Figs. 10 and 11, the opening of the series of cards may be more quickly effected by oscillating the box or container or tilting it downwardly and forwardly, while the implement 10 is held in engagement with the selected card. Thus by holding the rearmost cards against movement and tilting the box downward the cards in advance of the selective implement 10 fall forward by gravity, thus opening the series of cards at the desired point. To facilitate this tilting movement the receptacle or box 1 has been shown in Fig. 8 mounted upon a pivoted or tilting base 42, whereby it is actuated to and fro about a transverse axis 43. While the device will operate quite successfully without such oscillatory means, this feature increases the rapidity with which the selection of desired cards may be made.

The series of cards or data sheets having been opened by any of the means previously described, of course remain open until closed by the operator. While it is possible to proceed to open the file at various points or different sections without first returning all of the cards to their normal condition, which is a rearwardly inclined position, in most instances it will be found desirable to do so. In order to return the cards to their normal rearwardly inclined position, wherein the index tabs or designations are prepared in full view to the operator, there is provided at the forward end of the box or receptacle 1, a pivoted oscillatory follower, 44, hinged at 45. This follower 44 swings forwardly freely with the movement of the index cards. To return the index cards the swinging follower 44 is provided with a plunger 46, projecting through the end wall of the box or container 1, by which the follower 44 may be oscillated.

The plunger 46 has a notch 46ª engaged by the lock 24 to secure the follower 44 in its closed position. The locking of the followers 20 and 44 is effected simultaneously by the lock 24. The data sheets are thus securely held in closed relation to prevent tampering by an unauthorized person. Inasmuch as the normal position of the cards is one in which they are rearwardly inclined, and movement necessary to open the series of cards at any selected point is a forward movement, it is convenient to have the sliding top 6 of the box or container in its rearward position at the beginning of operation. To this end the sliding top 6 is provided with a dependent lug or finger 47, which at the forward limit of movement of the sliding top 6, projects into the path of travel of the oscillating follower 44. If the sliding top 6 is in its advanced position at the moment the cards are to be returned to their normal rearwardly inclined position, the swinging follower 44 upon its inward movement under the influence of the plunger or handle 46, will engage the dependent lug or finger 47 and carry with it the sliding top 6, thereby automatically returning the top preparatory to the next selective movement.

Cross reference is made to co-pending application Serial No. 693057 filed February 15, 1924, and the construction claimed therein, which is a further development and amplification of the present construction.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise but one of several modes of putting the invention into effect, and the invention is therefore claimed in any of its forms of modifications within the legitimate and valid scope of the appended claims.

Having thus described my invention, I claim:

1. In a filing device, a container for a series of data sheets resting upon their edges, a perforated cover for the container through which access may be had for manually oscillating the sheets but preventing the removal or disarrangement of the sheets.

2. In a filing device a container for a succession of vertically arranged data sheets, a cover therefor having access openings therein, and an independent selective implement insertable through the access openings of the cover for the purpose of oscillating the data sheets.

3. In a filing device, a container for a succession of vertically arranged data sheets, a movable cover therefor having therein a slot extending in parallel relation with the data sheets and brought approximately into registry with different filed data sheets by the movement of the cover, for the deposit of additional data sheets through said slot in predetermined relation with previously filed data sheets.

4. In a filing device, a container for a succession of vertically arranged data sheets, a movable cover for the container having therein an opening through which additional data sheets may be deposited at different points in said succession of sheets upon the movement of the cover to corresponding positions.

5. In a filing device, a container for a series of vertically arranged data sheets, a movable cover therefor, having a slot therein substantially parallel with the data sheets, a selecting implement manually introducible through said slot to separate the data sheets, additional data sheets being introducible through the slot between the separated sheets within the container.

6. In a filing device, a file box adapted to contain a series of relatively movable file members, said file members being prearranged in groups, a protective closure for the box through which the file members may be observed but preventing the removal or disarrangement thereof, and means common to a plurality of groups of the file members of the series and operable from the exterior of the box for causing a separation between any two successive groups of the relatively movable members.

7. In a filing device, a file box adapted to contain a series of relatively movable file members, a perforated closure for the box through which selective means may be introduced for separating the series of file members at desired points.

8. In a filing device, a file box adapted to contain a series of relatively movable file members, a closure for the box through which the contents thereof may be observed and having access openings through which selective means may be introduced, but through which the file members cannot be removed.

9. In a filing device, a file box adapted to contain a series of relatively movable file members, and a closure for the box including a plurality of transparent plates spaced one from the other to afford an intermediate access opening through which selective apparatus may be introduced to shift the filed members.

10. In a filing device, a file box adapted to contain a series of relatively movable file members, and a closure for the box including a plurality of spaced barriers preventing the removal or disarrangement of the filed members. Said barriers being separated one from another to afford access openings through which the filed members may be manipulated.

11. In a filing device, a file box adapted to contain a series of relatively movable file members, a sliding closure for the box and means for engaging with the sliding closure and with selected filed members whereby the movement of the closure will effect the movement of certain filed members.

12. In a filing device, a file box adapted to contain a series of relatively movable file members, a movable closure for the box and means for shifting a portions of the filed members independent of the remainder of such members by the movement of the closure.

13. In a filing device, a file box, a series of oscillatory file members therein, a movable closure for the box and means for effecting the oscillation of the file members by the movement of the closure.

14. In a filing device, a file box, a series of oscillatory file members therein, a movable closure for the box, and means for separately engaging with the movable closure and with different oscillatory file members of the series whereby such file members will be oscillated by the subsequent movement of the closure.

15. In a filing device, a file box, a series of relatively movable file members contained therein, a reciprocatory member common to all the members of the series, and means for engaging with the operating member and with different members of the series whereby said members may be shifted in relation with other members.

16. In a filing device, a file box, a series of relatively movable file members therein, separable into prearranged groups, an operating element common to particular file members, indicative of the several groups, and operable from the exterior of the box, and means for engaging said operating element with any one of said indicating file members of the respective groups, and by subsequent operation of the element separating said series of members into prearranged groups.

17. In a filing device, a file box, a series of relatively movable file elements therein, a reciprocatory operating member having access opening therein, a coupling member introducible through the access openings into engagement with different file members of the series, said file members being relatively shifted by the subsequent reciprocation of the operating member.

18. In a filing device, a file box mounted for tilting movement, a series of relatively movable file members contained therein, and means for restraining a portion of the file members whereby said series is separable into sections by gravity upon tilting the box.

19. In a filing device, a file box adapted to contain a series of relatively movable file members, means for restraining the movement of a portion of said file members and an oscillatory base upon which the box is mounted, by the oscillation of which a certain portion of the relatively movable file members may be separated by gravity from the restrained members.

20. In a filing device, a file box, a mounting for said box upon which the box is capable of rocking movement, a series of relatively movable file members contained within the file box, the box being capable of tilting movement in a plane common with the direction of relative movement of the members, and means for restraining a portion of the file members whereby the remaining members will be separated from the restrained portion by gravity upon tilting the box.

21. In a filing device, a file box, a mounting for said box upon which the box is capable of rocking movement, a series of oscillatory file members contained within the file box, and means for preventing the oscillation of a portion of said members, the remaining members being separable therefrom by oscillatory movement under influence of gravity upon the tilting of the box.

22. In a filing device, a file box adapted to contain a series of relatively movable file members, of a perforated protective closure for said file box and selective means common to all the file members of the series and insertable through the perforations of the protective closure of the box and manually movable to part the file members into portions at any point in the series.

23. In a filing device, a file box adapted to contain a series of relatively movable file members, a protective closure for the box through which the file members may be operatively engaged for relative movement of different file members but preventing the removal or disarrangement thereof, and means insertable through the closure for separating the series of relatively movable members.

24. In a filing device, a file box, a series of relatively movable file members contained therein, and selecting means operable from the exterior of the box including a reciprocatory member and means for connecting the reciprocatory member with any one of a number of different file members of the series, any one of such engaged members being subsequently actuated independent of other members of the series by the movement of the reciprocatory member.

25. In a filing device, a file box, a series of relatively movable file members contained therein, a reciprocating closure for the box, including a plurality of transparent sections through which the contents of the box may be observed, said sections being separated one from another to afford an intermediate access opening, and a coupling member to be introduced through such access opening into engagement with the enclosed file members whereby the subsequent movement of the closure will effect the movement of the file members.

26. In a filing device, a file box mounted for rocking movement, a series of relatively movable file members contained therein, a closure for the box, and means operable from the exterior of the box for restraining a portion of the members against movement while the remainder are shifted by influence of gravity upon rocking movement of the box.

27. In a filing device, a file box, a series of relatively movable file members contained therein, a perforated closure for the box and means introducible through the perforations of the closure for restraining a portion of said members against movement while the remainder are shifted by influence of gravity.

28. In a filing device, a file box, a series of relatively movable file members contained therein, a perforated closure therefor and means introducible through the perforations of said closure for shifting a portion of the file members within the box independent of the remaining members.

29. In a filing device, a file box, a series of relatively movable file members contained therein, a movable perforated closure, and means introducible through the perforations thereof for interconnecting selected members with the closure for subsequent movement in unison with the movement of the closure independent of other members of the series.

30. In a filing device, a file box, a series of relatively movable file members therein, a series of apertures in the file box, and a separate selecting member manually inserted through any one of the apertures into engagement with selected file members and adapted by manual manipulation to shift a portion of the file members in relation with the remaining members, or to hold a portion of the file members against movement while the remaining members are shifted by influence of gravity, thereby separating the series of members into sections.

31. In a filing device, a series of relatively movable file members, an enclosure therefor normally preventing access to said members for removal or disarrangement but having openings therein permitting the insertion of file members therethrough, and selective means common to all of the members insertable through any one of the openings in the enclosure into engagement with a selected file member, the selective means and adjacent file members being movable relatively to each other, to expose to observation the selected member.

32. In a filing device, a series of relatively movable file members, an enclosure therefor normally preventing access to said members for removal or disarrangement thereof but permitting observation thereof, said members being separable into predetermined groups and a manually operable selecting device engageable with members of different groups by different degrees of rotation and further capable of reciprocatory movement by which the series of members may be separated according to the selected groups.

33. In a filing device, a file box, a series of relatively movable file members therein, a reciprocatory selective member also capable of revoluble movement, a series of engaging projections carried by said selective member and adapted to be adjusted into engaging relation with certain predetermined file members by the rotation of the selective member, said file members being adapted to be shifted by the subsequent reciprocation of the selective member to expose the selected member.

34. In a filing device, a container for a series of separable data sheets, a reciprocatory cover for said container, a movable follower member for the data sheets and interengaging means whereby the movement of one of said members will actuate the other member.

35. In a filing device a container for a series of separable data sheets, a reciprocatory closure therefor, a movable follower member adapted to return the data sheets to normal after separation, and means for retracting the reciprocatory closure simultaneously with the return of the data sheets.

36. In a filing device a container for a series of separable data sheets, a movable closure therefor, a movable follower, and a projection on the closure extending into the path of the follower, whereby the closure is actuated in one direction by the movement of the follower.

37. In a filing device a container for a series of separable data sheets, movable follower members at opposite extremities of the series of data sheets, and means operable from the exterior of the container for relatively adjusting the follower members each independently of the other to clamp the data sheets in closed relation.

38. In a filing device a container for a series of separable data sheets, independently movable follower members at opposite extremities of the series of data sheets, and means common to both follower members for locking the movable follower members in adjusted relation one with the other to maintain the data sheets in closed relation.

39. In a filing device a container for a series of separable data sheets, an oscillatory follower at one terminal of said series, means for oscillating the follower to move the data sheets to closed relation, and a lock for said oscillatory follower by which the separation of the sheets for observation may be prevented.

40. In a filing device a container for a series of separable data sheets, a reciprocatory follower, and an oscillatory follower, located at opposite ends of the series of data sheets, and independently adjustable in relation with each other, and means common to both the followers for simultaneously locking said members against relative movement.

41. In a filing device, a container for a series of separable data sheets, two independently movable follower members one at each end of the series of data sheets and a lock common to both follower members.

42. In a filing device, a container for a series of separable data sheets, a movable side for the container, oscillatory links to which the side is pivoted supporting and guiding the movable side through an adjustment in which the upper edge of the side swings outwardly and downwardly and the lower edge moves upwardly to present the movable side in a substantially horizontal position and afford lateral access to the container.

43. In a filing device, a container for a series of separable data sheets, a movable side section for said container, and swinging links connected to said movable side, and partially controlling its movement to and from closed position, whereby access may be had to the container through a vertical side thereof.

44. In a filing device, a container for a series of separable data sheets, said container having a movable side section, links pivotally connecting a medial portion of the side section with the container, and stop means on the container for the side section whereby the side section is supported when open in a substantially horizontal position.

45. In a filing device a container for a series of vertically arranged separable data sheets, a transparent top closure therefor, said container having an access opening in the side thereof, and a closure for said access opening.

46. In a protected file, a container for a plurality of data sheets, having a transparent area through which the sheets within the container may be observed, said container also having an aperture in a plane extending at substantially right angles to the plane of the sheets, through which an implement may be inserted in substantially parallel relation with the data sheets and by which the sheets may be separated within the container to permit observation thereof.

47. In a protected file box, a housing for a series of data sheets, comprising a transparent panel through which the data sheets may be observed, the housing having an access opening in a plane perpendicular to the plane of the data sheets through which access may be had for separating the sheets to expose to view a selected sheet.

48. In a filing device, a series of relatively movable file members, a container therefor normally preventing access to said file members for removal or disarrangement but having openings therein, and selective means common to all the file members insertable through any one of the openings in the container into engagement with a selected file member, the selective means and a portion of the file members determined by the position of the selected file member being relatively movable by which the selected file member may be exposed to observation.

49. In a filing device, a series of oscillatory file members, a container therefor preventing access thereto for removal and disarrangement, but permitting observation thereof, said container having therein a plurality of spaced access openings, and a selective implement insertable through any one of said openings into a position intermediate successive file members to expose to view a selected file member by the relative movement of said inserted implement and the portion of file members at one side thereof.

In testimony whereof, I have hereunto set my hand this 8th day of August, A. D. 1919.

RODNEY J. WOOD.